(12) United States Patent
Mizuno

(10) Patent No.: US 8,410,957 B2
(45) Date of Patent: Apr. 2, 2013

(54) TRAFFIC LIGHT PASSING SUPPORT SYSTEM, IN-VEHICLE APPARATUS FOR THE SAME, AND METHOD FOR THE SAME

(75) Inventor: Yusuke Mizuno, Anjo (JP)

(73) Assignee: DENSO CORPORATION, Kariya (JP)

( * ) Notice: Subject to any disclaimer, the term of this patent is extended or adjusted under 35 U.S.C. 154(b) by 319 days.

(21) Appl. No.: 12/805,028

(22) Filed: Jul. 8, 2010

(65) Prior Publication Data
US 2011/0018701 A1    Jan. 27, 2011

(30) Foreign Application Priority Data

Jul. 22, 2009   (JP) ................................ 2009-171543

(51) Int. Cl.
G08G 1/09 (2006.01)
(52) U.S. Cl. ........................................ 340/905; 340/438
(58) Field of Classification Search .................. 340/905, 340/906, 907, 438; 701/117
See application file for complete search history.

(56) References Cited

U.S. PATENT DOCUMENTS

| | | | | |
|---|---|---|---|---|
| 4,296,400 A * | 10/1981 | Becker Friedbert et al. | . | 340/989 |
| 5,952,941 A * | 9/1999 | Mardirossian | ................ | 340/936 |
| 6,064,319 A * | 5/2000 | Matta | ............................ | 340/917 |
| 6,629,515 B1 * | 10/2003 | Yamamoto et al. | ......... | 123/179.4 |
| 6,989,766 B2 * | 1/2006 | Mese et al. | ..................... | 340/907 |
| 7,734,275 B2 * | 6/2010 | Kubota et al. | .................. | 455/344 |
| 7,796,020 B2 * | 9/2010 | Suzuki | ............................ | 340/438 |
| 7,983,836 B2 * | 7/2011 | Breed | ............................ | 701/117 |
| 8,248,219 B2 * | 8/2012 | Sato et al. | .................... | 340/425.5 |
| 2005/0134478 A1 * | 6/2005 | Mese et al. | ...................... | 340/901 |
| 2005/0231385 A1 * | 10/2005 | Haase | ............................. | 340/905 |
| 2010/0106413 A1 * | 4/2010 | Mudalige | ....................... | 701/213 |

FOREIGN PATENT DOCUMENTS

| EP | 2 082 913 A1 | 7/2009 |
|---|---|---|
| JP | A-05-128400 | 5/1993 |
| JP | A-2006-018587 | 1/2006 |
| JP | A-2006-331098 | 12/2006 |
| JP | A-2008-191909 | 8/2008 |

OTHER PUBLICATIONS

Office Action mailed on Apr. 19, 2011 issued from the Japanese Patent Office in the corresponding Japanese Patent Application No. 2009-171543 (English translation enclosed).

* cited by examiner

*Primary Examiner* — Jennifer Mehmood
*Assistant Examiner* — Rufus Point
(74) *Attorney, Agent, or Firm* — Posz Law Group, PLC

(57) ABSTRACT

An in-vehicle arithmetic unit calculates a required time, which is needed for a vehicle to arrive at a traffic light when the vehicle maintains a present speed, according to a speed of the vehicle, a present position of the vehicle, and information on the traffic light. An in-vehicle determination unit determines whether the vehicle can pass the traffic light by maintaining the present speed, according to the required time and the traffic light information. An in-vehicle generating unit generates a request signal to request the traffic light to light a passing permission color such as a blue light after the required time elapses, in response to a determination that the vehicle cannot pass the traffic light. An in-vehicle transmission unit transmits the request signal to the traffic light. A control unit of the traffic light controls the signal light according to the transmitted request signal.

9 Claims, 5 Drawing Sheets

TRAFFIC LIGHT PASSING SUPPORT SYSTEM, IN-VEHICLE APPARATUS FOR THE SAME, AND METHOD FOR THE SAME

CROSS REFERENCE TO RELATED APPLICATIONS

This application is based on and incorporates herein by reference Japanese Patent Applications No. 2009-171543 filed on Jul. 22, 2009.

FIELD OF THE INVENTION

The present invention relates to a traffic light passing support system including an in-vehicle apparatus and a traffic light and for supporting a vehicle, which includes the in-vehicle apparatus, to pass the traffic light. The present invention further relates to the in-vehicle apparatus for the traffic light passing support system. The present invention further relates to a method for supporting a vehicle to pass a traffic light.

BACKGROUND OF THE INVENTION

For example, Publication of Unexamined Japanese Patent Application 5-128400 (JP-A-5-128400) discloses a conventional art. In the art of JP-A-5-128400, when a vehicle travels on a road provided with a roadside beacon, the roadside beacon transmits information to the vehicle. The transmitted information is related to a position of a traffic light currently being ahead of the vehicle in a traveling direction and parameters of a lighting color change of the traffic light. The parameters may include a cycle, a split, and an offset of the lighting color change. The vehicle receives the transmitted information on the parameters and determines a time period, in which a blue light of the traffic light is lighting, according to the received parametric information. In addition, the vehicle calculates a speed range by which the vehicle can pass the blue light of the traffic light and indicates the calculated speed range on a display device.

According to the art disclosed in JP-A-5-128400, a driver of the vehicle drives the vehicle so as to maintain the speed of the vehicle within the speed range indicated on the display device, and thereby reducing a number of start and stop of the vehicle. As a result, fuel consumption of the vehicle can be reduced. However, when a lighting time of a red light of a traffic light being ahead of the vehicle is long enough, the speed range, by which the vehicle can pass a blue light of the traffic light, may be calculated to be a low-speed range. In this case, a driver of the vehicle has to drive the vehicle to maintain the low-speed range. Consequently, the driver may feel uncomfortable while driving the vehicle to maintain the low-speed range.

SUMMARY OF THE INVENTION

In view of the foregoing and other problems, it is an object of the present invention to produce a traffic light passing support system capable of reducing fuel consumption while restricting a driver from feeling troublesomeness in a speed control of a vehicle. It is another object of the present invention to produce an in-vehicle apparatus for the traffic light passing support system. It is another object of the present invention to produce a method for supporting a vehicle to pass a traffic light.

According to one aspect of the present invention, a traffic light passing support system for supporting a vehicle to pass a traffic light, the traffic light passing support system comprises an in-vehicle apparatus provided to the vehicle. The traffic light passing support system further comprises a traffic light including a signal light and a traffic-light control unit configured to control the signal light. The in-vehicle apparatus includes a first acquisition unit configured to successively obtain vehicle speed information on a speed of the vehicle. The in-vehicle apparatus further includes a second acquisition unit configured to successively obtain present position information on a present position of the vehicle. The in-vehicle apparatus further includes an third acquisition unit configured to successively obtain traffic light information including a location of the traffic light, a lighting cycle of the traffic light, and a transition time before a color of the traffic light is changed to a subsequent color. The in-vehicle apparatus further includes a first arithmetic unit configured to calculate an at-constant-speed required, time, which is needed for the vehicle to arrive at the traffic light when the vehicle maintains a vehicle speed, according to the vehicle speed information, the present position information, and the traffic light information. The in-vehicle apparatus further includes a determination unit configured to determine whether the vehicle can pass the traffic light by maintaining the vehicle speed, according to the at-constant-speed required time and the traffic light information. The in-vehicle apparatus further includes a request generating unit configured to, in response to a determination of the determination unit that the vehicle cannot pass the traffic light, generate a first request signal to request the traffic light to control the signal light so as to light a passing permission color after the at-constant-speed required time elapses. The in-vehicle apparatus further includes an in-vehicle transmission unit configured to transmit the first request signal to the traffic light. The traffic light includes a traffic-light receiving unit configured to receive the first request signal transmitted from the in-vehicle transmission unit. The traffic-light control unit is configured to control the signal light according to the first request signal received by the traffic-light receiving unit.

According to another aspect of the present invention, an in-vehicle apparatus for a traffic light passing support system for supporting a vehicle to pass a traffic light, the traffic light passing support system including a traffic light, which includes a signal light and a traffic-light control unit for controlling the signal light, the in-vehicle apparatus comprises a first acquisition unit configured to successively obtain vehicle speed information on a speed of the vehicle. The in-vehicle apparatus further comprises a second acquisition unit configured to successively obtain present position information of the vehicle. The in-vehicle apparatus further comprises a third acquisition unit configured to successively obtain traffic light information including a location of the traffic light, a lighting cycle, and a transition time before a color of the traffic light is changed to a subsequent color. The in-vehicle apparatus further comprises a first arithmetic unit configured to calculate an at-constant-speed required time, which is needed for the vehicle to arrive at the traffic light when the vehicle maintains a vehicle speed, according to the vehicle speed information, the present position information, and the traffic light information. The in-vehicle apparatus further comprises a determination unit configured to determine whether the vehicle can pass the traffic light by maintaining the vehicle speed, according to the at-constant-speed required time and the traffic light information. The in-vehicle apparatus further comprises a request generating unit configured to, in response to a determination of the determination unit that the vehicle cannot pass the traffic light, generate a first request signal to request the traffic light to control the signal light so as to light a passing permission color after the at-constant-speed required time elapses. The in-vehicle apparatus further comprises an in-vehicle transmission unit configured to transmit the first request signal to the traffic light.

According to another aspect of the present invention, a method for supporting a vehicle to pass a traffic light, the method comprises successively obtaining vehicle speed information on a speed of the vehicle by an in-vehicle apparatus. The method further comprises successively obtaining present position information on a present position of the vehicle by the in-vehicle apparatus. The method further comprises successively obtaining traffic light information including a location of the traffic light, a lighting cycle of the traffic light, and a transition time by the in-vehicle apparatus, the transition time being a time before a color of the traffic light is changed to a subsequent color. The method further comprises calculating an at-constant-speed required time by the in-vehicle apparatus according to the obtained vehicle speed information, the obtained present position information, and the obtained traffic light information, the at-constant-speed required time being a time needed for the vehicle to arrive at the traffic light when the vehicle maintains a vehicle speed. The method further comprises determining by the in-vehicle apparatus whether the vehicle can pass the traffic light when maintaining the vehicle speed according to the calculated at-constant-speed required time and the obtained traffic light information. The method further comprises generating a first request signal by the in-vehicle apparatus, in response to a determination that the vehicle cannot pass the traffic light, to request the traffic light to control a signal light so as to light a passing permission color after the at-constant-speed required time elapses. The method further comprises transmitting the first request signal from the in-vehicle apparatus to the traffic light. The method further comprises receiving the transmitted first request signal by the traffic light. The method further comprises controlling the signal light by the traffic light according to the received first request signal.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
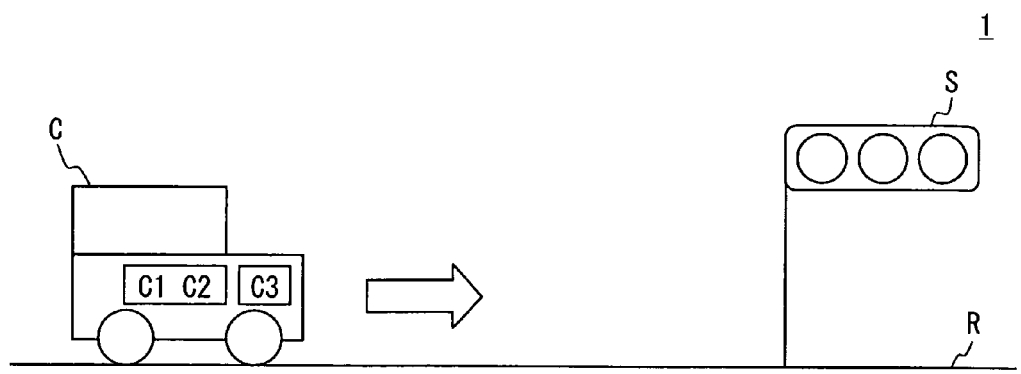
FIG. 1 is a schematic diagram showing a traffic light passing support system according to an embodiment.
Figure 2:
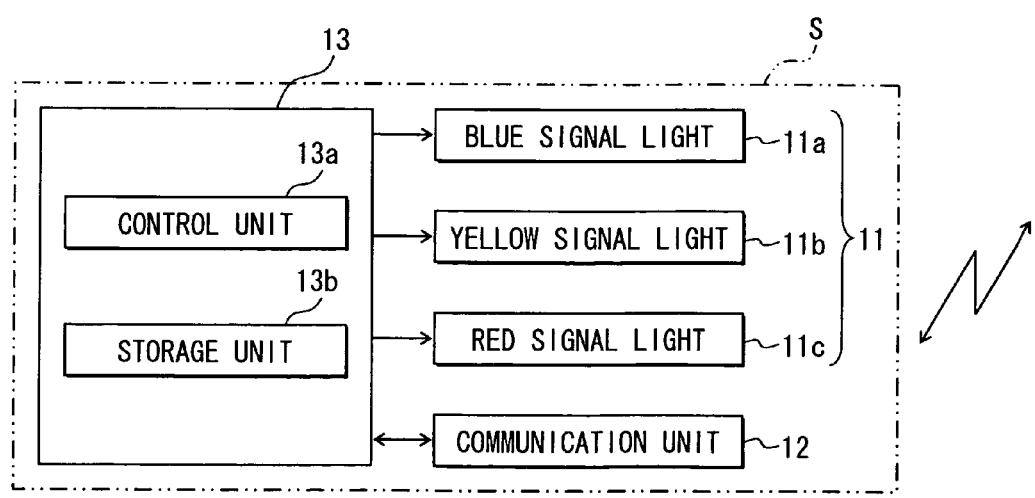
FIG. 2 is a block diagram showing a configuration of a traffic light of the traffic light passing support system according to the embodiment.
Figure 3:
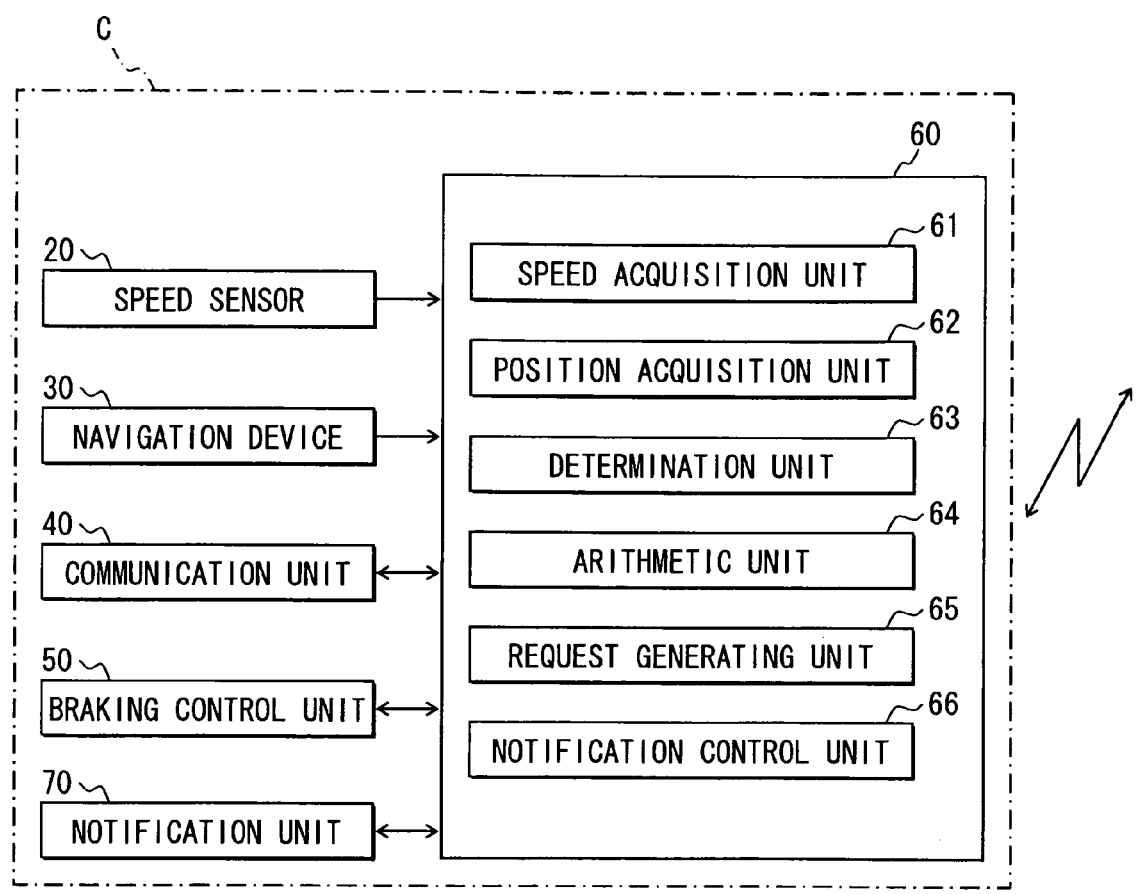
FIG. 3 is a block diagram showing a configuration of a vehicle and an in-vehicle device of the vehicle related to the traffic light passing support system according to the embodiment.

As follows, an embodiment of a traffic light passing, support system will be described with reference to FIG. 1 to FIG. 6. FIG. 1 is a schematic diagram showing an entire traffic light passing support system 1. FIG. 2 is a block diagram showing a structure of a traffic light S. FIG. 3 is a block diagram showing a structure of a vehicle C. First, a structure and a function of the traffic light passing support system 1 will be described with reference to FIG. 1 to FIG. 3.

As shown in FIG. 1, the traffic light passing support system 1 includes the traffic light S located on a road R. As shown in FIG. 2, the traffic light S includes a signal light 11, a traffic-light-side wireless communication unit 12, and a traffic-light-side control device 13. The signal light 11 is located on a roadside such that the signal light 11 can be viewed by a driver of the vehicle C. The signal light 11 includes, for example, a blue signal light 11a, a yellow signal light 11b, and a red signal light 11c. Each of the signal lights 11a to 11c is configured of a light emitting element such as a light emitting diode (LED). The signal light 11 is connected to the traffic-light-side control device 13. The traffic-light-side control device 13 repeatedly controls to activate and deactivate one of the signal lights 11a to 11c for a predetermined time period at a predetermined lighting cycle. Each of the signal lights 11a to 11c is assigned with a lighting color. Specifically, the traffic-light-side control device 13 controls to activate the blue signal light 11a to emit a blue light so as to accept a vehicle to pass through. The traffic-light-side control device 13 controls the yellow signal light 11b and the red signal light 11c to respectively emit a yellow light and a red light to prohibited a vehicle from passing therethrough. The yellow light permits a vehicle to pass therethrough when a vehicle excessively approaches a predetermined stop position and when it is rather dangerous if the vehicle quickly decelerates from the position to stop at the predetermined stop position. Alternatively, the yellow light permits a vehicle to pass therethrough when a vehicle has passed through a predetermined stop position and when it is rather dangerous if the vehicle quickly stops. According to the present embodiment, the signal light 11 includes the blue signal light 11a, the yellow signal light 11b, and the red signal light 11c. Both the yellow signal light 11b and the red signal light 11c prohibit a vehicle from passing through. Therefore, the yellow signal light 11b is deemed to be a part of the red signal light 11c for convenience. The yellow signal light 11b may be omitted.

The traffic-light-side wireless communication unit 12 includes a communications antenna (not shown). The traffic-light-side wireless communication unit 12 is connected to the traffic-light-side control device 13. The communication area of the traffic-light-side wireless communication unit 12 is, for example, centered on the traffic light S including the traffic-light-side wireless communication unit 12. The communication area has a range such as 100 m from the center such that the traffic light S can be visually recognized from the vehicle C. The traffic-light-side wireless communication unit 12 receives various information transmitted from the traffic-light-side control device 13. In response to receiving the various information, the traffic-light-side wireless communication unit 12 transmits the received various information to the vehicle C located in a communication range via wireless communications through the communications antenna.

On the other hand, the traffic-light-side wireless communication unit 12 receives various information transmitted from the vehicle C located in the communication range through the communications antenna. In response to receiving the various information, the traffic-light-side wireless communication unit 12 outputs the received various information to the traffic-light-side control device 13. In this way, the traffic light S transmits various information to the vehicle C and receives various information transmitted from the vehicle C. In the present embodiment, the communication range of the traffic-light-side wireless communication unit 12 is exemplified by about 100 m of a radius from the center on the traffic light S including the traffic-light-side wireless communication unit 12. It is noted that the communication range of the traffic-light-side wireless communication unit 12 may be arbitrarily determined. The traffic-light-side wireless communication unit 12 is equivalent to a traffic-light-side receiving unit (traffic-light receiving unit) and a traffic-light-side transmission unit (traffic-light transmission unit).

The traffic-light-side control device 13 includes a traffic-light-side control unit (traffic-light control unit) 13a and a traffic-light-side storage unit 13b. The traffic-light-side control unit 13a may be a generally-known computer including an internal memory device (not shown). The traffic-light-side control unit 13a performs various operations in line with a program beforehand stored in the internal memory device, the traffic-light-side storage unit 13b, which functions as an external memory device, and the like. For example, the various operations includes an activation and deactivation control operation of the signal light 11 and a transmission-and-reception operation of various information performed by the traffic-light-side wireless communication unit 12. For example, the various operations further includes an acceptance and non-acceptance determination operation with respect to a first permission color light request obtained by the transmission-and-reception operation, an acceptance and non-acceptance determination operation with respect to a second permission color light request obtained by the transmission-and-reception operation, and the like. The traffic-light-side storage unit 13b may be configured of a generally-known information storage device such as a flash memory and a hard disk drive. The traffic-light-side storage unit 13b stores a program executed by the traffic-light-side control unit 13a and traffic light information related to the traffic light S.

The traffic-light-side control device 13 performs the activation and deactivation control operation of the signal light 11. The traffic-light-side control device 13 sets a predetermined lighting time to each of the lighting colors. In addition, the traffic-light-side control device 13 repeatedly performs an activation and deactivation control of the signal light 11. Specifically, the traffic-light-side control device 13 sets the lighting time Tb of the blue signal light 11a to 40 seconds and sets the lighting time Tr of the red signal light 11c to 60 seconds, for example. In addition, the traffic-light-side control device 13 changes an activated object from the blue signal light 11a to the red signal light 11c at a predetermined lighting cycle, for example.

In the present embodiment, the yellow signal light 11b is incorporated into a part of the red signal light 11c for convenience. Therefore, the activation and deactivation control is exemplified by switching from the blue signal light 11a to the red signal light 11c. It is noted that the traffic light side control unit 13a strictly performs the activation and deactivation control of the signal light 11 by switching from the blue signal light 11a to the yellow signal light 11b to the red signal light 11c. Similarly, in the present embodiment, the lighting time Tb of the blue signal light 11a is set to 40 seconds, and the lighting time Tr of the red signal light 11c is set to 60 seconds for convenience. It is noted that the traffic-light-side control unit 13a strictly divides the lighting time Tr of 60 seconds of the red signal light 11c into the lighting time Tr and a lighting time Ty of the yellow signal light 11b. The lighting time Ty of the yellow signal light 11b is set to, for example, 5 seconds and assigned in the beginning of the lighting time Tr.

The traffic-light-side control device 13 performs the transmission-and-reception operation of various information with respect to the traffic-light-side wireless communication unit 12. Information transmitted by the traffic-light-side wireless communication unit 12 includes traffic light information related to the traffic light S, an acceptance and non-acceptance determination result to a first permission color activation request signal (first request signal) RQ1, and an acceptance and non-acceptance determination result to a second permission color activation request signal (second request signal) RQ2. The traffic light information includes the location (absolute position) of the traffic light S, a lighting cycle of the traffic light S, a lighting time Tb and Tr of the colors of the traffic light S, a lighting color when the traffic light S transmits the traffic light information, and a transition time TR when the traffic light S transmits the traffic light information. The information received by the traffic-light-side wireless communication unit 12 includes the first permission color activation request signal RQ1 and the second permission color activation request signal RQ2.

The location of the traffic light S, the lighting cycle of the traffic light S, and the lighting time Tb and Tr of the colors of the traffic light S of the transmitted information are stored in the traffic-light-side storage unit 13b, read by the traffic-light-side control unit 13a from the traffic-light-side storage unit 13b, and transmitted as traffic light information by the traffic-light-side wireless communication unit 12. The transmitted traffic light information includes the transition time TR, which is a time period before the present color is changed to the next color. The transition time TR is calculated by the traffic-light-side control unit 13a and transmitted as traffic light information by the traffic-light-side wireless communication unit 12. Specifically, the traffic-light-side control unit 13a counts a time elapsed from a lighting start time when performing a lighting control of the blue signal light 11a. The traffic-light-side control unit 13a subtracts the elapsed time from the lighting time Tb of the blue light of the traffic light S stored in the traffic-light-side storage unit 13b, thereby to calculate the transition time TR before the color changes to the next red color (strictly, yellow). The traffic-light-side control unit 13a causes the traffic-light-side wireless communication unit 12 to transmit the calculated transition time TR as traffic light information. Similarly, the traffic-light-side control unit 13a counts a time elapsed from a lighting start time when performing a lighting control of the red signal light 11c. The traffic-light-side control unit 13a subtracts the elapsed time from the lighting time Tr of the red light of the traffic light S stored in the traffic-light-side storage unit 13b, thereby to calculate the transition time TR before the color changes to the next blue color. The traffic-light-side control unit 13a causes the traffic-light-side wireless communication unit 12 to transmit the calculated transition time TR as traffic light information.

When receiving the first permission color activation request signal RQ1 via the traffic-light-side wireless communication unit 12, the traffic-light-side control unit 13a determines whether to accept or refuse the received first permission color activation request signal RQ1. Thus, the traffic-light-side control unit 13a causes the traffic-light-side wireless communication unit 12 to transmit a acceptance and non-acceptance determination result AS1 as a result of the determination. When determining to accept the first permission color activation request signal RQ1, the traffic-light-side control unit 13a performs an activation and deactivation control of the traffic light S according to the accepted request.

Similarly, when receiving the second permission color activation request signal RQ2 via the traffic-light-side wireless communication unit 12, the traffic-light-side control unit 13a determines whether to accept or refuse the received second permission color activation request signal RQ2. Thus, the traffic-light-side control unit 13*a* causes the traffic-light-side wireless communication unit 12 to transmit a acceptance and non-acceptance determination result AS2 as a result of the determination. When determining to accept the second permission color activation request signal RQ2, the traffic-light-side control unit 13*a* performs an activation and deactivation control of the traffic light S according to the accepted request.

In the present embodiment, the traffic-light-side control unit 13*a* is capable of receiving the first permission color activation request signal RQ1 and the second permission color activation request signal RQ2 from another vehicle (not shown). When not performing the activation and deactivation control of the traffic light S and when receiving a request, the traffic-light-side control unit 13*a* accepts the request and performs the activation and deactivation control of the traffic light S according to the request. Alternatively, when receiving another request while performing the activation and deactivation control of the traffic light S according to one request, the traffic-light-side control unit 13*a* refuses the received another request. When not receiving a request, the traffic-light-side control unit 13*a* performs the activation and deactivation control of the traffic light S repeatedly at a predetermined lighting cycle. The first permission color activation request signal RQ1 and the second permission color activation request signal RQ2 will be described later.

In FIG. 1, the vehicle C of the traffic light passing support system 1 is, for example, a hybrid vehicle, which has a power source including a gasoline engine and a motor, or the like. Such a hybrid vehicle includes a regenerative braking device C1 (regenerative device, not shown) to cause a motor to function as a generator so as to generate electric power by utilizing a braking power.

As shown in FIG. 3, the vehicle C includes a vehicle speed sensor 20, an in-vehicle navigation device 30, an in-vehicle wireless communication unit 40, a brake device control unit 50, an in-vehicle control device 60, a friction brake device C3, an in-vehicle battery C2, and the like. The vehicle speed sensor 20 is, for example, a generally-known sensor for detecting a vehicle speed of the vehicle C. The vehicle speed sensor 20 is connected to the in-vehicle control unit 60 via a controller area network (CAN, not shown), for example. When detecting the vehicle speed of the vehicle C, the vehicle speed sensor 20 transmits information of the detected vehicle speed to the in-vehicle control unit 60 through the CAN. In this way, a vehicle speed information acquisition unit (first acquisition unit) 61 of the in-vehicle control unit 60 successively obtains vehicle speed information on the vehicle C.

The in-vehicle navigation device 30 may be a generally-known apparatus including a position detecting unit such as a GPS receiver for receiving a GPS signal from a GPS satellite (not shown). The in-vehicle navigation device 30 detects the present position (absolute position) of the vehicle C according to map information stored in a memory device (not shown) and/or the like and guides a user to a destination. For example, the in-vehicle navigation device 30 is connected to the in-vehicle control unit 60 via the CAN (not shown). When detecting the present position of the vehicle C, the in-vehicle navigation device 30 transmits the detected present position information to the in-vehicle control unit 60 through the CAN. In this way, a present position information acquisition unit (second acquisition unit) 62 of the in-vehicle control unit 60 obtains the present position information on the vehicle C.

The in-vehicle wireless communication unit 40 includes a communications antenna (not shown). The in-vehicle wireless communication unit 40 is connected to the in-vehicle control unit 60. For example, the in-vehicle wireless communication unit 40 has a communication range of about 100 m correspondingly to the traffic-light-side wireless communication unit 12. The in-vehicle wireless communication unit 40 receives various information transmitted from the in-vehicle control unit 60. In response to receiving various information, the in-vehicle wireless communication unit 40 transmits the received various information to the traffic light S located in the communication range via wireless communications through the communications antenna. On the other hand, the in-vehicle wireless communication unit 40 receives various information transmitted from the traffic light S located in the communication range through the communications antenna. In response to receiving the various information, the in-vehicle wireless communication unit 40 outputs the received various information to the in-vehicle control unit 60. In this way, the in-vehicle control unit 60 transmits and receives various information with respect to the traffic light S. In the present embodiment, the communication range of the in-vehicle wireless communication unit 40 is exemplified by about 100 m of a radius from the center on the vehicle C. It is noted that the communication range of the in-vehicle wireless communication unit 40 may be arbitrarily determined.

The information transmitted by the in-vehicle wireless communication unit 40 includes the first permission color activation request signal RQ1 and the second permission color activation request signal RQ2 to be described later. The information received by the in-vehicle wireless communication unit 40 includes the traffic light information (location of the traffic light S), the lighting cycle of the traffic light S, the lighting time Tb and Tr of colors of the traffic light S, the lighting color when the traffic light information is transmitted, the transition time TR when the traffic light information is transmitted, the acceptance and non-acceptance determination result AS1 to the first permission color activation request signal RQ1, and the acceptance and non-acceptance determination result AS2 to the second permission color activation request signal RQ2. The in-vehicle wireless communication unit 40 is equivalent to a traffic light information acquisition unit (third acquisition unit) and an in-vehicle transmission unit.

The brake device control unit 50 controls the friction brake device (C3) and the regenerative braking device C1 of the vehicle C. The brake device control unit 50 is connected to the in-vehicle control unit 60. The friction brake device (C3) may be a generally-known brake mechanism for converting a kinetic energy of the vehicle C into a thermal energy and discharging the converted thermal energy. The regenerative braking device C1 may be a generally-known brake mechanism for converting a kinetic energy of the vehicle C into an electric energy and recovering the converted electric energy. The electric energy recovered by the regenerative braking device C1 is to be accumulated in the in-vehicle battery C2. It is noted that the in-vehicle battery C2 can accumulate a limited electric energy in a unit time.

The limit of an electric energy is caused by the following reasons. The in-vehicle battery C2 therein causes an exothermal reaction as a charge reaction when being charged. Therefore, as an electricity charged to the in-vehicle battery C2 per unit time increases, a thermal energy caused in the in-vehicle battery C2 per unit time increases. Therefore, as the charged electricity per unit time increases, the temperature of the in-vehicle battery C2 increases.

On the other hand, the temperature of the in-vehicle battery C2 needs to be restricted from exceeding a predetermined upper temperature limit so as to keep the life of the in-vehicle battery C2. Therefore, an upper limit is specified to an electric energy charged to the in-vehicle battery C2 in a unit time. As follows, the upper limit of the electric energy charged in a unit time is termed a regenerated power limit.

As described above, the regenerated power limit is specified such that the temperature of the battery does not exceed the predetermined upper limit. Therefore, the regenerated power limit may be specified based on the temperature of the battery, such that the regenerated power limit increases as the temperature of the battery decreases. It is noted that the temperature of the battery may be maintained constant for convenience, thereby the regenerated power limit may be set to a fixed value. In the present embodiment, the former is employed.

A braking power causing the regenerated power limit is specified to be a regenerated-power-limit braking power (limit braking power). The brake device control unit 50 controls the braking power caused by the regenerative braking device C1 not to exceed the regenerated-power-limit braking power. In this case, only the braking power caused by the regenerative braking device C1 may be less than a required braking power. Therefore, the brake device control unit 50 causes the friction brake device (C3) to generate additional braking power to suffice the required braking power. The required braking power may be determined using a data map based on, for example, a brake depression force detectable from a brake hydraulic pressure and an accelerator position.

The brake device control unit 50 calculates a deceleration quantity of the vehicle using, for example, a data map stored beforehand based on the regenerated-power-limit braking power. Further, the brake device control unit 50 outputs the deceleration quantity as a regeneration limit deceleration quantity α to the in-vehicle control unit 60. In a state where neither acceleration nor braking is performed, the brake device control unit 50 causes the regenerative braking device C1 to generate the regenerated-power-limit braking power. Therefore, in the state where neither acceleration nor braking is performed, the vehicle decelerates by the regeneration limit deceleration quantity α.

The in-vehicle control unit 60 obtains the regeneration limit deceleration quantity α of the vehicle C from the brake device control unit 50. The in-vehicle control unit 60 may be a generally-known computer including a generally-known CPU, a memory device such as a ROM and a RAM, and I/O device, and a bus line connecting these devices. In the following description, the in-vehicle control unit 60 has functions produced by a program stored in the memory device and executed by the CPU. The functions of the in-vehicle control unit 60 includes a vehicle speed information acquisition unit 61, a present position information acquisition unit 62, a traffic light passing determination unit 63, a required time arithmetic unit 64, a permission color activation request generating unit 65, and an in-vehicle notification control unit 66. The in-vehicle control unit 60 is equivalent to an in-vehicle control unit.

As described above, the vehicle speed information acquisition unit 61 obtains the vehicle speed information outputted from the vehicle speed sensor 20 through the CAN. The present position information acquisition unit 62 obtains the present position information outputted from the in-vehicle navigation device 30 through the CAN.

The in-vehicle wireless communication unit 40 obtains the traffic light information at an acquisition time point. The traffic light passing determination unit 63 determines a lighting color of the traffic light S when an arbitrary determined time has elapsed from the acquisition time point.

The traffic light information received by the in-vehicle wireless communication unit 40 includes the lighting cycle of the traffic light S, the lighting time of each color (Tb and Tr) of the traffic light S, the lighting color when the traffic light information is transmitted, and the transition time TR when the traffic light information is transmitted. Therefore, the traffic light passing determination unit 63 is capable of determining the lighting color of the traffic light S when a specified time T has elapsed from the acquisition time point of the traffic light information, based on the information obtained by the in-vehicle wireless communication unit 40.

Specifically, in the state where the traffic light information is transmitted, when the blue signal light 11$a$ is activated and when the specified time T≧the transition time TR, the traffic light passing determination unit 63 determines that the red signal light 11$c$ will be activated after the specified time T elapses. Alternatively, in the state where the traffic light information is transmitted, when the blue signal light 11$a$ is activated and when the specified time T<the transition time TR, the traffic light passing determination unit 63 determines that the blue signal light 11$a$ will be still activated after the specified time T elapses.

Similarly, in the state where the traffic light information is transmitted, when the red signal light 11$c$ is activated and when the specified time T≧the transition time TR, the traffic light passing determination unit 63 determines that the blue signal light 11$a$ is activated after the specified time T elapses. Alternatively, in the state where the traffic light information is transmitted, when the red signal light 11$c$ is activated and when the specified time T<the transition time TR, the traffic light passing determination unit 63 determines that the red signal light 11$c$ will be still activated after the specified time T elapses.

The traffic light passing determination unit 63 is capable of determining the lighting color of the traffic light S after various specified times T elapse. In the present embodiment, the traffic light passing determination unit 63 determines the lighting color of the traffic light S after a first required time Tc1 elapses or after a second required time Tc2 elapses. The first required time Tc1 and the second required time Tc2 are calculated by the required time arithmetic unit 64.

In the present embodiment, the traffic light passing determination unit 63 determines the lighting color after the specified time T elapses from a reception time point of the traffic light information, based on the traffic light information at a transmission time point from the traffic light S. Therefore, a time deviation may arise between the transmission time point of the traffic light information and the reception time point when the lighting color is determined. Nevertheless, since the communication range is narrow, the time deviation between the time points is very slight. Therefore, such a time deviation does not affect the determination of the lighting color.

When receiving the traffic light information via the in-vehicle wireless communication unit 40, the required time arithmetic unit 64 calculates the first required time Tc1 and the second required time Tc2. The first required time Tc1 is a time period required in the state where the vehicle C maintains the vehicle speed V0 when receiving the traffic light information until arriving at the location of the traffic light S. The second required time Tc2 is a time period required in the state where the vehicle C performs neither acceleration nor braking from the vehicle speed V0 when receiving the traffic light information until arriving at the location of the traffic light S. The first required time Tc1 is equivalent to a at-constant-speed required time. The second required time Tc2 is equivalent to a in-deceleration required time.

The traffic light information obtained by the in-vehicle wireless communication unit 40 includes the location of the traffic light S. The required time arithmetic unit 64 obtains the vehicle speed V0 of the vehicle C from the vehicle speed sensor 20. The required time arithmetic unit 64 further obtains the present position information on the vehicle C from the in-vehicle navigation device 30. The required time arithmetic unit 64 further obtains the regeneration limit deceleration quantity α from the brake device control unit 50.

On receiving the information, the required time arithmetic unit 64 first calculates a distance L from the present position of the vehicle C to the location of the traffic light S. The calculated distance L is along a road R on which the vehicle C presently travels.

After calculating the distance L, the required time arithmetic unit 64 calculates the first required time Tc1 from the following formula (1).

$$Tc1 = L/V0 \quad (1)$$

After calculating the distance L, the required time arithmetic unit 64 calculates the vehicle speed V after the second required time Tc2 elapses from the following formula (2).

$$V = V0 + \alpha \times Tc2 \quad (2)$$

The following formula (3) specifies the relationship among the distance L, the vehicle speed V0 of the vehicle C, the regeneration limit deceleration quantity α, and the second required time Tc2.

$$L = V0 \times Tc2 + \frac{1}{2} \times \alpha \times Tc^2 \quad (3)$$

Thus, the required time arithmetic unit 64 calculates the second required time Tc2 from the following formula (4).

$$Tc2 = \frac{\sqrt{2 \times \alpha \times V0^2} - V0}{1} \quad (4)$$

The required time arithmetic unit 64 is equivalent to an at-constant-speed required time arithmetic unit (first arithmetic unit) and an in-deceleration required time arithmetic unit (second arithmetic unit).

When the traffic light passing determination unit 63 determines that the traffic light S will activate the red signal light 11c after the first required time Tc1 elapses, the permission color activation request generating unit 65 generates the first permission color activation request signal RQ1 to request to activate the blue signal light 11a after the first required time Tc1 elapses.

Specifically, it is supposed a state where the red signal light 11c is activated at the time of transmission of the traffic light information, and the traffic light passing determination unit 63 determines that the traffic light S will activate, the red signal light 11c after the first required time Tc1 elapses. In the present state, the permission color activation request generating unit 65 generates the first permission color activation request signal RQ1 to request to reduce the lighting time of the red signal light 11c by a reduction time TR11 (=TR−Tc1).

Similarly, it is supposed a state where the blue signal light 11a is activated at the time of transmission of the traffic light information, and the traffic light passing determination unit 63 determines that the traffic light S will activate the red signal light 11c after the first required time Tc1 elapses. In the present state, the permission color activation request generating unit 65 generates the first permission color activation request signal RQ1 to request to extend the lighting time of the blue signal light 11a by an extension time TR12 (=Tc1−TR).

When the traffic light passing determination unit 63 determines that the traffic light S will activate the red signal light 11c after the first required, time Tc1 elapses and after the second required time Tc2 elapses, the permission color activation request generating unit 65 generates the second permission color activation request signal RQ2 to request to activate the blue signal light 11a after the second required time Tc2 elapses.

Specifically, it is supposed a state where the red signal light 11c is activated at the time of transmission of the traffic light information, and the traffic light passing determination unit 63 determines that the traffic light S wily activate the red signal light 11c after the first required time Tc1 elapses and after the second required time Tc2 elapses. In the present state, the permission color activation request generating unit 65 generates the second permission color activation request signal RQ2 to request to reduce the lighting time of the red signal light 11c by a reduction time TR21 (=TR−Tc2).

Similarly, it is supposed a state where the blue signal light 11a is activated at the time of transmission of the traffic light information, and the traffic light passing determination unit 63 determines that the traffic light S will activate the red signal light 11c after the first required time Tc1 elapses and after the second required time Tc2 elapses. In the present state, the permission color activation request generating unit 65 generates the second permission color activation request signal RQ2 to request to extend the lighting time of the blue signal light 11a by an extension time TR22 (=Tc2−TR).

The in-vehicle notification control unit 66 is configured to control a notification unit 70 such as a generally-known display device and a generally-known speaker. The in-vehicle notification control unit 66 is equivalent to a notification control unit.

Specifically, when the traffic light passing determination unit 63 determines that the traffic light S will activate the blue signal light 11a after the first required time Tc1 elapses, the in-vehicle notification control unit 66 causes a display unit or a speaker to notify that "the vehicle can pass the traffic light S without stopping by maintaining the vehicle speed V0."

In this manner, a driver of the vehicle C can recognize that "the vehicle C can pass the traffic light S without stopping, by maintaining the vehicle speed V0 as it is." Thereby, the driver of the vehicle C is enabled to pass the traffic light S without stopping, by driving the vehicle C to maintain the vehicle speed V0 as it is.

It is supposed that the in-vehicle wireless communication unit 40 receives the acceptance and non-acceptance determination result AS1 indicating that the first permission color activation request signal RQ1 is accepted. In the present state, the in-vehicle notification control unit 66 causes a display unit and/or a speaker to notify that "the vehicle C can pass the traffic light S without stopping, by maintaining the vehicle speed as it is." In this case, the driver may drive the vehicle C while maintaining the vehicle speed V0 as it is, and thereby the vehicle C can pass the traffic light S without stopping.

It is supposed that the in-vehicle wireless communication unit 40 receives the acceptance and non-acceptance determination result AS2 indicating that the second permission color activation request signal RQ2 is accepted. In the present state, the in-vehicle notification control unit 66 causes a display unit and/or a speaker to notify that "the vehicle C can pass the traffic light S without stopping, by decelerating without braking and acceleration." In this manner, the driver of the vehicle C can recognize that "the vehicle C can pass the traffic light S by decelerating without braking and acceleration." Thereby, the driver of the vehicle C is enabled to pass the traffic light S without stopping, by driving the vehicle C without braking and acceleration.

It is supposed that the in-vehicle wireless communication unit 40 receives the acceptance and non-acceptance determination result AS2 indicating that the second permission color activation request signal RQ2 is refused (not accepted). In the present state, the in-vehicle notification control unit 66 causes a display unit and/or a speaker to notify that "the vehicle C cannot pass the traffic light S without braking (i.e., braking is needed)." In this manner, the driver of the vehicle C can recognize that "the vehicle C cannot pass the traffic light S, and braking is needed." Thereby, the driver of the vehicle C is enabled to further safely stop the vehicle C at the location of the traffic light S.

Figure 4:
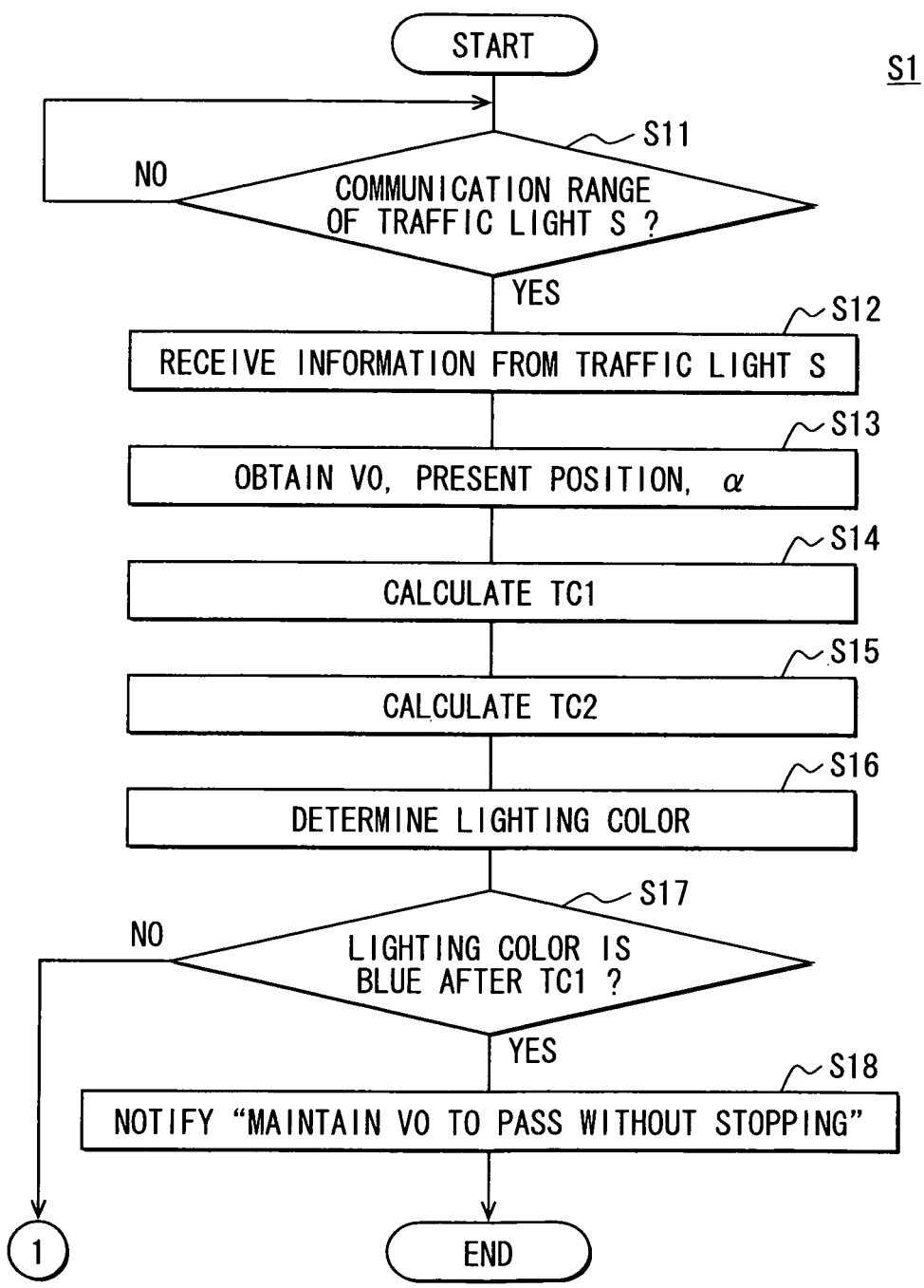
FIG. 4 is a flow chart showing a part of a traffic light passing support operation according to the present embodiment.
Figure 5:
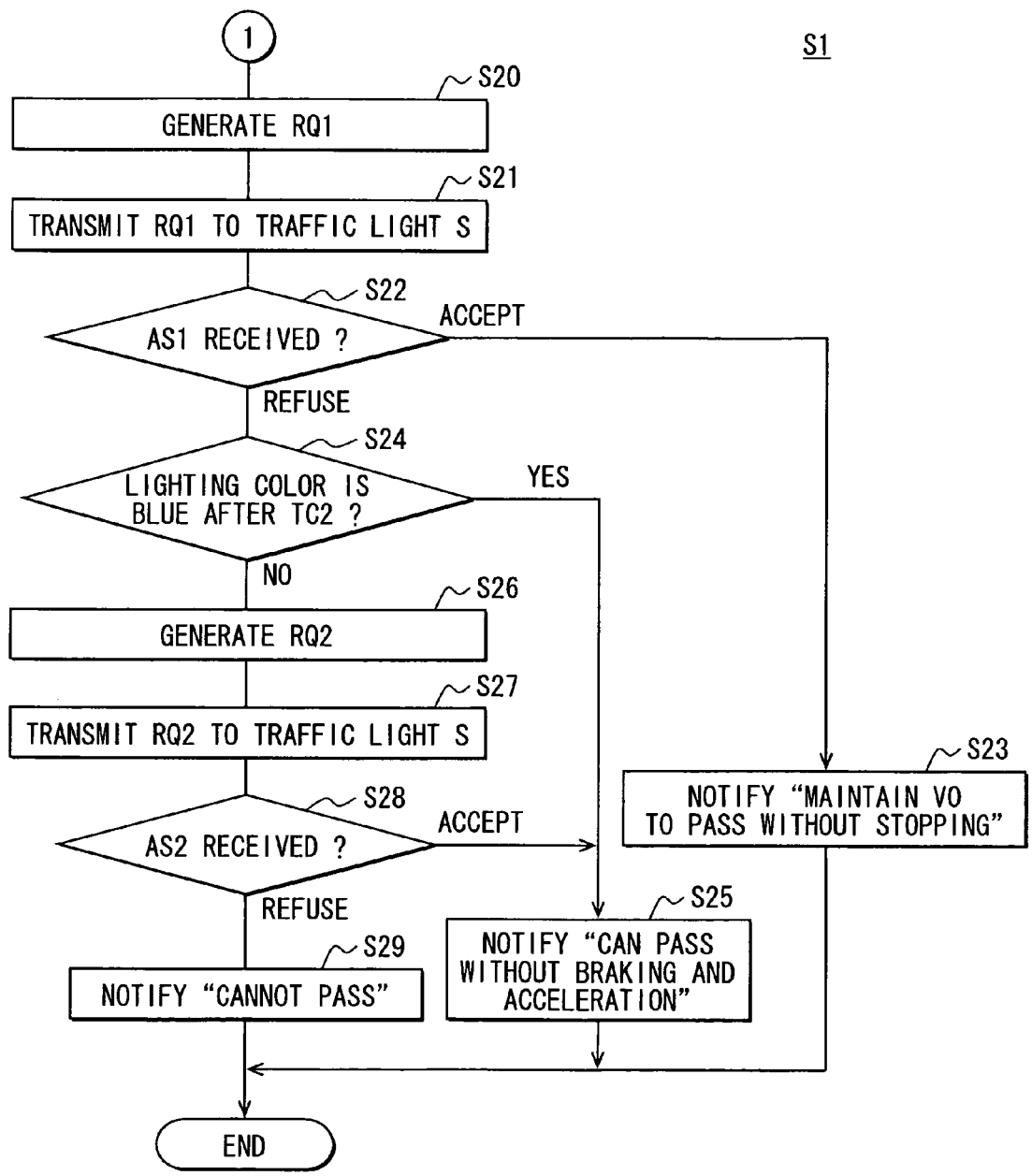
FIG. 5 is a flow chart showing a remaining part of the traffic light passing support operation according to the present embodiment.

As follows, an operation of the light passing support system 1 will be described with reference to FIGS. 4 and 5. FIG. 4 is a flow chart for explaining a part of a traffic light passing support operation S1 according to the present embodiment. FIG. 5 is a flow chart for explaining a remaining part of the traffic light passing support operation S1 according to the present embodiment. The traffic light passing support operation S1 shown in FIGS. 4 and 5 is repeatedly executed at a predetermined cycle.

In the start of the traffic light passing support operation S1, the in-vehicle control unit 60 first performs a determination operation at step S11. Specifically, at step S11, the in-vehicle control unit 60 determines whether the vehicle C is in the communication range of the traffic light S located ahead of the vehicle C in the traveling direction. More specifically, the in-vehicle control unit 60 determines whether an intensity of a signal received by using the in-vehicle wireless communication unit 40 is higher than a predetermined threshold. When the in-vehicle control unit 60 determines that the intensity of the received signal is less than or equal to the predetermined threshold, the determination operation of step S11 makes a negative determination. In this case, the in-vehicle control unit 60 determines that the vehicle. C is out of the communication service of the traffic light S and repeats the determination operation at step S11. Alternatively, when the in-vehicle control unit 60 determines that the intensity of the received signal is greater than the predetermined threshold, the determination operation of step S11 makes a positive determination. In this case, the in-vehicle control unit 60 determines that the vehicle C is out of the communication range of the traffic light S and repeats the determination operation at step S11. In other words, through the determination operation of step S11, the in-vehicle control unit 60 waits until the vehicle C enters the communication range of the traffic light S.

When the vehicle C enters the communication range of the traffic light S, at subsequent step S12, the in-vehicle control unit 60 causes the in-vehicle wireless communication unit 40 to receive traffic light information transmitted from the traffic light S. At subsequent step S13, the in-vehicle control unit 60 obtains the vehicle speed V0, the present position, and the regeneration limit deceleration quantity α from other devices and sensors of the vehicle C.

After obtaining the information at step 13, at subsequent step S14, the in-vehicle control unit 60 calculates the first required time Tc1 needed for the vehicle C to arrive at the location of the traffic light S in the case where the vehicle C maintains the vehicle speed V0 when obtaining the traffic light information. At subsequent step S15, the in-vehicle control unit 60 calculates the second required time Tc2 needed for the vehicle C to arrive at the location of the traffic light S in the case where the vehicle C decelerates without braking and acceleration from the vehicle speed V0 when obtaining the traffic light information.

Subsequent to calculation of the first required time Tc1 and the second required time Tc2, at step S16, the in-vehicle control unit 60 determines the lighting color after the first required time Tc1 elapses from a reception time point of the traffic light information and the lighting color after the second required time Tc2 elapses from the reception time point of the traffic light information.

Subsequent to determination of the lighting color in this way, at step S17, the in-vehicle control unit 60 determines whether the traffic light S will activate the blue signal light 11a after the first required time Tc1 elapses.

When the in-vehicle control unit 60 determines that the traffic light S will activate the blue signal light 11a, step S17 makes a positive determination. In this case, the determination means that the vehicle C can pass the traffic light S without stopping, by maintaining the vehicle speed V0 at the reception time point of the traffic light information. Thus, at step 18, the in-vehicle notification control unit 66 causes a display unit and/or a speaker to notify that "the vehicle C can pass the traffic light S without stopping, by maintaining the vehicle speed V0 as it is." Thus, the driver may drive the vehicle C while maintaining the vehicle speed V0 as it is, and thereby the vehicle C can pass the traffic light S, without stopping.

Alternatively, when the in-vehicle control unit 60 determines that the traffic light S will not activate the blue signal light 11a, step S17 makes a negative determination. In this case, the determination means that the vehicle C cannot pass the traffic light S without stopping, even when maintaining the vehicle speed V0 at the reception time point of the traffic light information. Therefore, at subsequent step S20, the in-vehicle control unit 60 generates the first permission color activation request signal RQ1 to request to activate the blue signal light 11a after the first required time Tc1 elapses. At subsequent step S21, the in-vehicle control unit 60 causes the in-vehicle wireless communication unit 40 to transmit the generated first permission color activation request signal RQ1.

When the traffic light S receives the first permission color activation request signal RQ1 via the traffic-light-side wireless communication unit 12, the traffic-light-side control unit 13a determines whether to accept or refuse the received first permission color activation request signal RQ1. Thus, the traffic-light-side control unit 13a causes the traffic-light-side wireless communication unit 12 to transmit the acceptance and non-acceptance determination result AS1 as a result of the determination. When determining to accept the first permission color activation request signal RQ1, the traffic-light-side control unit 13a performs an activation and deactivation control of the traffic light S according to the accepted request.

At subsequent step S22, the in-vehicle control unit 60 determines whether the in-vehicle wireless communication unit 40 has received the acceptance and non-acceptance determination result AS1. When the in-vehicle control unit 60 determines that the in-vehicle wireless communication unit 40 has received the acceptance and non-acceptance determination result AS1 and when the received acceptance and non-acceptance determination result AS1 indicates to accept the first permission color activation request signal RQ1, the processing proceeds to step S23. At subsequent step S23, the in-vehicle control unit 60 causes a display unit and/or a speaker to notify that "the vehicle C can pass the traffic light S without stopping, by maintaining the vehicle speed V0 as it is." Thus, the driver may drive the vehicle C while maintaining the vehicle speed V0 as it is, and thereby the vehicle C can pass the traffic light S, without stopping.

Alternatively, at step S22, when the in-vehicle control unit 60 determines that the in-vehicle wireless communication unit 40 has not received the acceptance and non-acceptance determination result AS1 or when the received acceptance and non-acceptance determination result AS1 indicates to refuse the first permission color activation request signal RQ1, the processing proceeds to step S24. At subsequent step S24, the in-vehicle control unit 60 determines whether the traffic light S will activate the blue signal light 11a after the second required time Tc2 elapses.

When the in-vehicle control unit 60 determines that the traffic light S will activate the blue signal light 11a, step S24 makes a positive determination. In this case, the determination means that the vehicle C can pass the traffic light S without stopping, by decelerating without braking and acceleration, i.e., by decelerating by the regeneration limit deceleration quantity α. Thus, at step 25, the in-vehicle notification control unit 66 causes a display unit and/or a speaker to notify that "the vehicle C can pass the traffic light S without stopping, by decelerating without braking and acceleration." Thus, the driver may drive the vehicle C without braking and acceleration, and thereby the vehicle C can pass the traffic light S, without stopping.

Alternatively, when the in-vehicle control unit 60 determines that the traffic light S will not activate the blue signal light 11a, step S24 makes a negative determination. In this case, the determination means that the vehicle C cannot pass the traffic light S without stopping, even when decelerating the vehicle C by the regeneration limit deceleration quantity α. Therefore, at subsequent step S26, the in-vehicle control unit 60 generates the second permission color activation request signal RQ2 to request to activate the blue signal light 11a after the second required time Tc2 elapses. At subsequent step S27, the in-vehicle control unit 60 causes the in-vehicle wireless communication unit 40 to transmit the generated second permission color activation request signal RQ2.

When the traffic light S receives the second permission color activation request signal RQ2 via the traffic-light-side wireless communication unit 12, the traffic-light-side control unit 13a determines whether to accept or refuse the received second permission color activation request signal RQ2. Thus, the traffic-light-side control unit 13a causes the traffic-light-side wireless communication unit 12 to transmit the acceptance and non-acceptance determination result AS2 as a result of the determination. When determining to accept the second permission color activation request signal RQ2, the traffic-light-side control unit 13a performs an activation and deactivation control of the traffic light S according to the accepted request.

At subsequent step S28, the in-vehicle control unit 60 determines whether the in-vehicle wireless communication unit 40 has received the acceptance and non-acceptance determination result AS2. When the in-vehicle control unit 60 determines that the in-vehicle wireless communication unit 40 has received the acceptance and non-acceptance determination result AS2 and when the received acceptance and non-acceptance determination result AS2 indicates to accept the second permission color activation request signal RQ2, the processing proceeds to step S25.

Alternatively, at step S28, when the in-vehicle control unit 60 determines that the in-vehicle wireless communication unit 40 has not received the acceptance and non-acceptance determination result AS2 or when the received acceptance and non-acceptance determination result AS2 indicates to refuse the second permission color activation request signal RQ2, the processing proceeds to step S29. At subsequent step S29, the in-vehicle control unit 60 causes a display unit and/or a speaker to notify that "the vehicle C cannot pass the traffic light S without braking (i.e., braking is needed)." Thereby, the driver of the vehicle C can prepare for braking to enable the vehicle C to safely stop at the location of the traffic light S.

Figure 6:
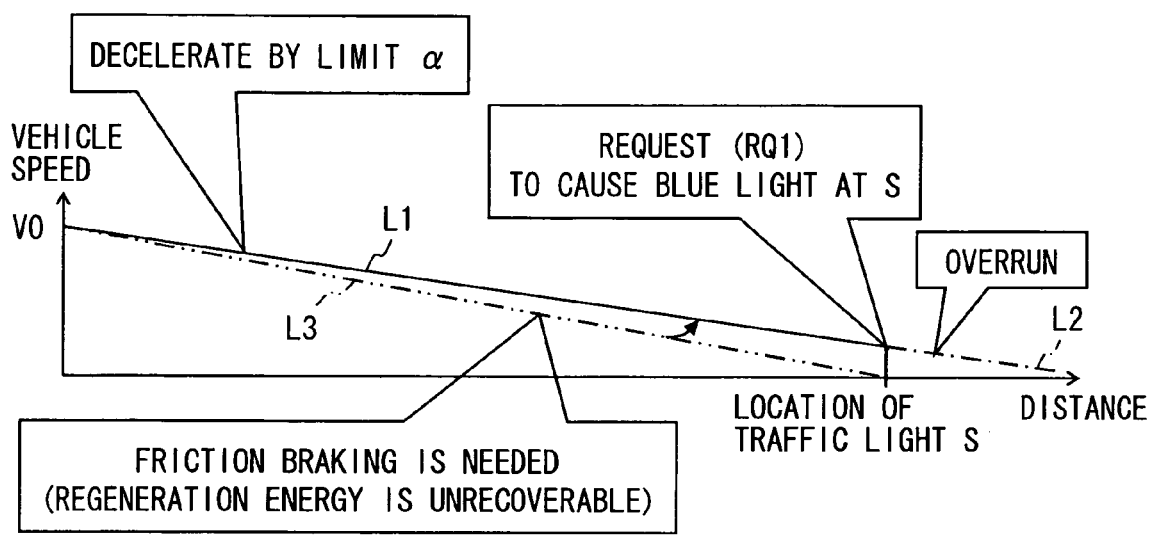
FIG. 6 is a view showing an operation of the traffic light passing support system according to the present embodiment.

FIG. 6 is a view showing one example of an operation of the traffic light passing support system 1 according to the present embodiment. In FIG. 6, the solid line L1 and the dashed dotted line L2 show one example of a relationship between the distance and the vehicle speed when the vehicle C decelerates from the vehicle speed V0 by the regeneration limit deceleration quantity α, such that the vehicle C can recover all the braking power as a regeneration energy. The two-dot chain lines L3 also shows a relationship between the distance and the vehicle speed when the vehicle C decelerates from the vehicle speed V0, similarly to the lines L1 and L2. It is noted that the two-dot chain lines L3 shows a case when the vehicle C decelerates such that the vehicle C stops at the location of the traffic light S.

As shown by the lines L1 and L2, when the vehicle decelerates by the regeneration limit deceleration quantity α, the vehicle speed becomes 0 at the position beyond the traffic light S. Therefore, in this case, when the vehicle C decelerates by the regeneration limit deceleration quantity α, the vehicle C cannot stop at the location of the traffic light S to overrun beyond the location of the traffic light S. Accordingly, it is supposed that the vehicle C performs friction braking to be decelerated by a deceleration quantity larger than the regeneration limit deceleration quantity α so as not to overrun the location of the traffic light S. In this case, as shown by the two-dot chain line L3, so as to stop the vehicle C at the location of the traffic light S, a part of the braking power is unrecoverable as a regeneration energy.

On the contrary, in the present embodiment, the in-vehicle control unit 60 is configured to transmit the first permission color activation request signal RQ1 to the traffic light S. When the traffic light S performs the activation and deactivation control according to the transmitted request signal, the vehicle C can arrive at the traffic light S in the state where the blue light is activated, by performing deceleration by the regeneration limit deceleration quantity α without braking and acceleration. Therefore, as shown by the line L1, the vehicle C can pass the traffic light S without stopping. In this way, fuel consumption can be reduced, and it is possible to restrict the driver from feeling annoyance.

The traffic light passing support system 1 is not limited to that exemplified in the above-described embodiment and may be variously modified. For example, the traffic light passing support system 1 may be modified as described below and may be in practical use.

For example, in the above-described embodiment, the brake device control unit 50 controls the braking power of the regenerative braking device C1 not to exceed the regenerated-power-limit braking power corresponding to the regenerated power limit. It is noted that the regenerated-power-limit braking power is a limit resulting from the battery temperature. In general, a generator of a regenerative braking device C1 can generate electricity greater than the regenerated power limit. Therefore, when the battery temperature is temporarily permitted to exceed its upper limit, a large regenerative braking power may be temporarily caused such that generate electricity temporarily exceeds the regenerated power limit. That is, the regenerative braking device C1 may temporarily cause a deceleration quantity beyond the regeneration limit deceleration quantity a described in the above embodiment. In view of the foregoing, when step S28 makes a negative determination, the in-vehicle control unit 60 may output a regenerative braking power extension request signal to the brake device control unit 50 so as to request to temporarily increase the braking power caused by the regenerative braking device C1 to be greater than the regenerated-power-limit braking power. In response to the regenerative braking power extension request signal, when detecting a deceleration request from the driver, the brake device control unit 50 controls the regenerative braking device C1 to cause a braking power greater than the regenerated-power-limit braking power. The brake device control unit 50 determines whether a driver has caused a deceleration request according to detection of depression of the brake pedal and/or detection of a downshift operation, for example. In the case, the braking power caused by the regenerative braking device C1 is less than or equal to a braking power corresponding to the maximum capacity of power generation of the generator of the regenerative braking device C1.

In the traffic light passing support operation S1, step S28 may be omitted. In this case, the traffic light S does not determine whether to accept or refuse the first permission color activation request signal RQ1 transmitted from the vehicle C. Thus, the traffic light S performs the activation and deactivation control of the signal light 11 according to the received request.

Summarizing the above-described embodiment, an at-constant-speed required time arithmetic unit of an in-vehicle apparatus is configured to calculate an at-constant-speed required time, which is needed to arrive at a location of a traffic light when a vehicle maintains a speed, according to vehicle speed information, present position information, and traffic light information. A traffic light passing determination unit is configured to determine whether the vehicle can pass the traffic light by maintaining the speed, according to the at-constant-speed required time and the traffic light information. A permission color activation request generating unit is configured to: generate a first permission color activation request signal to request the signal light to activate a passing permission color in response to a determination that the vehicle cannot pass the traffic light after the at-constant-speed required time elapses; and an in-vehicle transmission transmit a first permission color activation request signal to the traffic light. A traffic-light-side receiving unit is configured to receive the first permission color activation request signal.

The traffic-light-side control unit controls activation and deactivation of the signal light according to the first permission color activation request signal. Thus, the vehicle, which transmitted the permission color request signal, is enabled to pass the traffic light, while maintaining the vehicle speed. Therefore, fuel consumption can be reduced, and a driver can be restricted from feeling a troublesomeness due to a vehicle speed control.

The traffic light is configured to transmit an acceptance and non-acceptance determination result to the in-vehicle apparatus when receiving the first permission color activation request signal. The acceptance and non-acceptance determination result indicates whether the signal light can be controlled according to the first permission color activation request signal.

Therefore, on receiving the acceptance and non-acceptance determination result, the in-vehicle apparatus is enabled to arbitrary perform a subsequent control according to the acceptance and non-acceptance determination result.

When receiving an acceptance and non-acceptance determination result, which indicates that the request corresponding to the first permission color activation request signal is refused, an in-deceleration required time arithmetic unit of the in-vehicle apparatus is configured to calculate an in-deceleration required time, the in-deceleration required time being needed to arrive at the location of the traffic light when, a driver of the vehicle does not perform both braking and acceleration. The traffic light passing determination unit is configured to determine whether the vehicle can pass the traffic light, in a state where the vehicle decelerates by a deceleration quantity while the driver of the vehicle does not perform both braking and acceleration, according to the in-deceleration required time and the traffic light information. In response to a determination that the vehicle cannot pass the traffic light in a state where the vehicle decelerates by the deceleration quantity, the permission color activation request generating unit is configured to generate the second permission color activation request signal to request the traffic light to activate the signal light so as to light a passing permission color after the in-deceleration required time elapses. An in-vehicle transmission unit transmits the second permission color activation request signal to the traffic light. When receiving the second permission color activation request signal, the traffic-light-side control unit of the traffic light controls the signal light according to the second permission color activation request signal. Thereby, the vehicle can pass the traffic light without stopping, while the driver of the vehicle, which transmitted the second permission color request signal, does not perform braking and acceleration.

The vehicle mounted with the in-vehicle apparatus includes a regenerative braking device C1 and an electricity accumulating device C2, which is configured to accumulate electricity regenerated by the regenerative braking device C1. In a state where both braking and acceleration are not performed, the regenerative braking device C1 is caused to generate a braking power smaller than a regenerated-power-limit braking power, which is an allowable limit value of the braking power generated by the regenerative braking device C1, and the friction brake device (C3) mounted in the vehicle is configured not to be operated. In the in-vehicle apparatus of the vehicle, the in-deceleration required time arithmetic unit is configured to calculate the in-deceleration required time in a state where the regenerative braking device C1 generates the regenerated-power-limit braking power and the friction brake device (C3) is not operated while the driver of the vehicle does not perform both braking and acceleration. In this manner, a vehicle, which decelerates only by generating regenerative braking power while a driver does not perform both braking and acceleration, it can be accurately determined whether the vehicle can pass the traffic light without stopping.

When the in-vehicle apparatus obtains an acceptance and non-acceptance determination result, which indicates that a request corresponding to the first permission color activation request signal is accepted, from the traffic light, the in-vehicle apparatus notifies that "the vehicle can pass the traffic light without stopping by maintaining the vehicle speed as it is." Thereby, the driver of the vehicle can recognize that "the vehicle can pass the traffic light without stopping by maintaining the vehicle speed as it is."

The traffic-light-side control unit is configured to transmit an acceptance and non-acceptance determination result to the in-vehicle apparatus when receiving the second permission color activation request signal from the in-vehicle apparatus. The acceptance and non-acceptance determination result indicates whether the signal light can be controlled according to the second permission color activation request signal. Therefore, on receiving the acceptance and non-acceptance determination result, the in-vehicle apparatus is enabled to arbitrary perform a subsequent control according to the acceptance and non-acceptance determination result.

When the in-vehicle apparatus obtains an acceptance and non-acceptance determination result, which indicates that a request corresponding to the second permission color activation request signal is accepted, from the traffic light, the in-vehicle apparatus notifies that "the vehicle can pass the traffic light without stopping by decelerating without braking and accelerating" Thereby, the driver of the vehicle can recognize that "the vehicle can pass the traffic light without stopping by decelerating without braking and accelerating."

When the in-vehicle apparatus obtains an acceptance and non-acceptance determination result, which indicates that a request corresponding to the second permission color activation request signal is not accepted, from the traffic light, the in-vehicle apparatus notifies that "the vehicle cannot pass the traffic light without stopping." Therefore, the driver of the vehicle can recognize that "the vehicle cannot pass the traffic light without braking", i.e., "braking is needed." Thereby, the driver of the vehicle is enabled to further safely stop the vehicle at the location of the traffic light.

The regenerated-power-limit braking power of the regenerative braking device C1 is set such that the regenerative braking device C1 is capable of generating a braking power larger than the regenerated-power-limit braking power. When obtaining an acceptance and non-acceptance determination result, which indicates that the request to the second permission color activation request signal is not accepted, from the traffic light, and when detecting a deceleration request from the driver before the vehicle arrives at the traffic light, the in-vehicle apparatus is configured to output a regenerative braking power extension request signal to a brake device control unit, which controls the regenerative braking device C1, so as to request to temporarily extend a braking power, which is generated by the regenerative braking device C1, to be greater than the regenerated-power-limit braking power.

When the in-vehicle apparatus obtains an acceptance and non-acceptance determination result, which indicates that a request corresponding to the second permission color activation request signal is not accepted, from the traffic light, the vehicle cannot pass the traffic light without stopping. That is, a deceleration quantity is insufficient even when the regenerative braking device C1 generates the regenerated-power-limit braking power. In this manner, the in-vehicle apparatus outputs a request to the brake device control unit so as to control the regenerative braking device C1 to temporarily extend the braking power. Thereby, the brake device control unit can determine that it is necessary to extend the regenerative braking power temporarily. Therefore, the brake device control unit is enabled to perform a control to extend the regenerative braking power temporarily. The regenerated-power-limit braking power is a value specified to secure a long life of the electricity accumulating device C2. Therefore, when the in-vehicle apparatus causes the regenerative braking device C1 to generate a regenerative braking power greater than the regenerated-power-limit braking power, the life of the accumulating electricity device may be shortened. Nevertheless, the regenerative braking power extension does not necessarily request to extend the regenerative braking power continuously but only requests to extend the regenerative braking power temporarily. Therefore, the life of the electricity accumulating device C2 is possibly maintained. In addition, electricity accumulating device C2 can accumulate a large quantity of electricity when the regenerative braking power is extended temporarily. Therefore, a large quantity of electricity can be accumulated in the electricity accumulating device C2. In addition, the life of the accumulating electricity device can be maintained.

The in-vehicle apparatus is used for the traffic light passing support system.

The above processings such as calculations and determinations are not limited being executed by the traffic-light-side control device 13 and the in-vehicle control unit 60. The control unit may have various structures including the traffic-light-side control device 13 and the in-vehicle control unit 60 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A traffic light passing support system for supporting a vehicle to pass a traffic light, the traffic light passing support system comprising:
    an in-vehicle apparatus provided to the vehicle; and
    a traffic light including a signal light and a traffic-light control unit configured to control the signal light,
    wherein the in-vehicle apparatus includes:
        a first acquisition unit configured to successively obtain vehicle speed information on a speed of the vehicle;
        a second acquisition unit configured to successively obtain present position information on a present position of the vehicle;
        a third acquisition unit configured to successively obtain traffic light information including a location of the traffic light, a lighting cycle of the traffic light, and a transition time before a color of the traffic light is changed to a subsequent color;
        a first arithmetic unit configured to calculate an at-constant-speed required time, which is needed for the vehicle to arrive at the traffic light when the vehicle maintains a vehicle speed, according to the vehicle speed information, the present position information, and the traffic light information;
        a determination unit configured to determine whether the vehicle can pass the traffic light by maintaining the vehicle speed, according to the at-constant-speed required time and the traffic light information;
        a request generating unit configured to, in response to a determination of the determination unit that the vehicle cannot pass the traffic light, generate a first request signal to request the traffic light to control the signal light so as to light a passing permission color after the at-constant-speed required time elapses; and
        an in-vehicle transmission unit configured to transmit the first request signal to the traffic light,
    wherein the traffic light includes a traffic-light receiving unit configured to receive the first request signal transmitted from the in-vehicle transmission unit, wherein the traffic-light control unit is configured to control the signal light according to the first request signal received by the traffic-light receiving unit, wherein the traffic light further includes a traffic-light transmission unit configured to transmit a signal to the in-vehicle apparatus, wherein the traffic-light control unit is further configured to:

determine whether the traffic-light control unit is capable of controlling the signal light according to the first request signal received by the traffic-light receiving unit and according to whether there is an other control request of a signal light from another in-vehicle apparatus of another vehicle; and cause the traffic-light transmission unit to transmit a determination result to the in-vehicle apparatus, wherein the in-vehicle apparatus further includes a second arithmetic unit configured to, in response to a determination result not to accept the first request signal, calculate an in-deceleration required time, which is needed for the vehicle to arrive at the traffic light when a driver of the vehicle does not perform both braking and acceleration, according to the vehicle speed information, the present position information, the traffic light information, and a deceleration quantity when the driver does not perform both braking and acceleration, wherein the determination unit is further configured to determine whether the vehicle can pass the traffic light when decelerating by the deceleration quantity, according to the in-deceleration required time and the traffic light information, wherein the request generating unit is further configured to, in response to a determination of the determination unit that the vehicle cannot pass the traffic light when decelerating by the deceleration quantity, generate the second request signal to request the traffic light to control the signal light to light a passing permission color after the in-deceleration required time elapses, wherein the in-vehicle transmission unit is further configured to transmit the second request signal to the traffic light, and wherein the traffic-light control unit is further configured to control the signal light according to the second request signal when the traffic-light receiving unit receives the second request signal.

2. The traffic light passing support system according to claim 1, wherein the vehicle further includes a regenerative braking device, an electricity accumulating device, which is configured to accumulate electricity regenerated by the regenerative braking device, and a friction brake device, the regenerative braking device is caused to generate a braking power smaller than a limit braking power, which is an allowable limit of the braking power generated by the regenerative braking device, and the friction brake device is not operated, in a state where the driver does not perform both braking and acceleration, the second arithmetic unit is further configured to calculate the in-deceleration required time in a state where the regenerative braking device generates the limit braking power, the friction brake device is not operated, and the driver of the vehicle does not perform both braking and acceleration.

3. The traffic light passing support system according to claim 1, wherein the in-vehicle apparatus further includes:

a notification unit configured to notify the driver; and a notification control unit configured to cause the notification unit to notify that the vehicle can pass the traffic light without stopping by maintaining the vehicle speed when the in-vehicle apparatus obtains a determination result to accept the first request signal from the traffic light.

4. The traffic light passing support system according to claim 1, wherein the traffic-light control unit is further configured to:

determine whether the traffic-light control unit is capable of controlling the signal light according to the second request signal received by the traffic-light receiving unit according to whether there is an other control request of a signal light from an other in-vehicle apparatus of an other vehicle; and cause the traffic-light transmission unit to transmit a determination result to the in-vehicle apparatus.

5. The traffic light passing support system according to claim 4, wherein the in-vehicle apparatus further includes:

a notification unit configured to notify the driver; and a notification control unit configured to cause the notification unit to notify that the vehicle can pass the traffic light without stopping by decelerating without braking and accelerating when the in-vehicle apparatus obtains a determination result to accept the second request signal from the traffic light.

6. The traffic light passing support system according to claim 4, wherein the in-vehicle apparatus further includes:

a notification unit configured to notify the driver; and a notification control unit configured to cause the notification unit to notify that the vehicle cannot pass the traffic light without stopping when the in-vehicle apparatus obtains a determination result not to accept the second request signal from the traffic light.

7. The traffic light passing support system according to claim 2, wherein the vehicle further includes a brake device control unit configured to control the regenerative braking device, wherein the regenerative braking device is capable of generating a braking power larger than the limit braking power being specified to secure a long life of the electricity accumulating device, the traffic-light control unit is further configured to:

determine whether the traffic-light control unit is capable of controlling the signal light according to the second request signal received by the traffic-light receiving unit and according to whether there is an other control request of a signal light from an other in-vehicle apparatus of an other vehicle; and cause the traffic-light transmission unit to transmit a determination result to the in-vehicle apparatus, the in-vehicle apparatus is further configured to output an extension request signal to the brake device control unit to request to temporarily extend a braking power generated by the regenerative braking device to be greater than the limit braking power when obtaining a determination result not to accept the second request signal from the traffic light and when detecting a deceleration request from the driver before the vehicle arrives at the traffic light.

8. An in-vehicle apparatus for a traffic light passing support system for supporting a vehicle to pass a traffic light, the traffic light passing support system including a traffic light, which includes a signal light and a traffic-light control unit for controlling the signal light, the in-vehicle apparatus comprising:
- a first acquisition unit configured to successively obtain vehicle speed information on a speed of the vehicle;
- a second acquisition unit configured to successively obtain present position information of the vehicle;
- a third acquisition unit configured to successively obtain traffic light information including a location of the traffic light, a lighting cycle, and a transition time before a color of the traffic light is changed to a subsequent color;
- a first arithmetic unit configured to calculate an at-constant-speed required time, which is needed for the vehicle to arrive at the traffic light when the vehicle maintains a vehicle speed, according to the vehicle speed information, the present position information, and the traffic light information;
- a determination unit configured to determine whether the vehicle can pass the traffic light by maintaining the vehicle speed, according to the at-constant-speed required time and the traffic light information;
- a request generating unit configured to, in response to a determination of the determination unit that the vehicle cannot pass the traffic light, generate a first request signal to request the traffic light to control the signal light so as to light a passing permission color after the at-constant-speed required time elapses;
- an in-vehicle transmission unit configured to transmit the first request signal to the traffic light; and
- a control unit configured to:
  - cause the traffic light to determine whether the traffic light is capable of controlling the signal light according to the first request signal transmitted from the in-vehicle transmission unit and according to whether there is another control request of a signal light from an other in-vehicle apparatus of another vehicle, and transmit a determination result to the in-vehicle apparatus;
- wherein the in-vehicle apparatus further in a second arithmetic unit configured to, in response to a determination result not to accept the first request signal, calculate an in-deceleration required time, which is needed for the vehicle to arrive at the traffic light when a driver of the vehicle does not perform both braking and acceleration, according to the vehicle speed information, the present position information, the traffic light information, and a deceleration quantity when the driver does not perform both braking and acceleration,
- wherein the determination unit is further configured to determine whether the vehicle can pass the traffic light when decelerating by the deceleration quantity, according to the in-deceleration required time and the traffic light information,
- wherein the request generating unit is further configured to, in response to a determination of the determination unit that the vehicle cannot pass the traffic light when decelerating by the deceleration quantity, generate the second request signal to request the traffic light to control the signal light to light a passing permission color after the in-deceleration required time elapses,
- wherein the in-vehicle transmission unit is further configured to transmit the second request signal to the traffic light, and
- wherein the control unit is further configured to cause the traffic light to control the signal light according to the second request signal when the traffic light receives the second request signal.

9. A method for supporting a vehicle to pass a traffic light, the method comprising:
- successively obtaining vehicle speed information on a speed of the vehicle by an in-vehicle apparatus;
- successively obtaining present position information on a present position of the vehicle by the in-vehicle apparatus;
- successively obtaining traffic light information including a location of the traffic light, a lighting cycle of the traffic light, and a transition time by the in-vehicle apparatus, the transition time being a time before a color of the traffic light is changed to a subsequent color;
- calculating an at-constant-speed required time by the in-vehicle apparatus according to the obtained vehicle speed information, the obtained present position information, and the obtained traffic light information, the at-constant-speed required time being a time needed for the vehicle to arrive at the traffic light when the vehicle maintains a vehicle speed;
- determining by the in-vehicle apparatus whether the vehicle can pass the traffic light when maintaining the vehicle speed according to the calculated at-constant-speed required time and the obtained traffic light information;
- generating a first request signal by the in-vehicle apparatus, in response to a determination that the vehicle cannot pass the traffic light, to request the traffic light to control a signal light so as to light a passing permission color after the at-constant-speed required time elapses;
- transmitting the first request signal from the in-vehicle apparatus to the traffic light;
- receiving the transmitted first request signal by the traffic light;
- controlling the signal light by the traffic light according to the received first request signal;
- determining by the traffic light whether the traffic light is capable of controlling the signal light according to the received first request signal and according to whether there is another control request of a signal light from another in-vehicle apparatus of another vehicle and transmitting a determination result to the in-vehicle apparatus;
- calculating by the in-vehicle apparatus, in response to a determination result not to accept the first request signal, an in-deceleration required time, which is needed for the vehicle to arrive at the traffic light when a driver of the vehicle does not perform both braking and acceleration, according to the vehicle speed information, the present position information, the traffic light information, and a deceleration quantity when the driver does not perform both braking and acceleration;
- determining by the in-vehicle apparatus whether the vehicle can pass the traffic light when decelerating by the deceleration quantity, according to the in-deceleration required time and the traffic light information;
- generating by the in-vehicle apparatus, in response to a determination that the vehicle cannot pass the traffic light when decelerating by the deceleration quantity, a second request signal to request the traffic light to control the signal light to light a passing permission color after the in-deceleration required time elapses;
- transmitting the second request signal to the traffic light; and
- controlling by the traffic light the signal light according to the second request signal when the traffic-light receiving unit receives the second request signal.

* * * * *